US008746053B2

(12) United States Patent
Brake et al.

(10) Patent No.: US 8,746,053 B2
(45) Date of Patent: Jun. 10, 2014

(54) METHOD FOR DETERMINING OPTIMUM VORTEX GENERATOR PLACEMENT FOR MAXIMUM EFFICIENCY ON A RETROFITTED WIND TURBINE GENERATOR OF UNKNOWN AERODYNAMIC DESIGN

(75) Inventors: Daniel Brake, Hobe Sound, FL (US); Jeffrey Hammitt, North Palm Beach, FL (US); Georgios Pechlivanoglou, Berlin (DE)

(73) Assignee: Inventus Holdings, LLC, Juno Beach, FL (US)

( * ) Notice: Subject to any disclaimer, the term of this patent is extended or adjusted under 35 U.S.C. 154(b) by 263 days.

(21) Appl. No.: 13/301,048

(22) Filed: Nov. 21, 2011

(65) Prior Publication Data

US 2012/0151769 A1    Jun. 21, 2012

Related U.S. Application Data

(60) Provisional application No. 61/423,921, filed on Dec. 16, 2010.

(51) Int. Cl.
B23P 15/04 (2006.01)

(52) U.S. Cl.
USPC .......................................................... 73/147

(58) Field of Classification Search
None
See application file for complete search history.

(56) References Cited

U.S. PATENT DOCUMENTS

| 4,086,808 A | 5/1978 | Camac et al. |
| 5,511,426 A | 4/1996 | Clement et al. |
| 6,910,867 B2 | 6/2005 | Corten |
| 7,059,833 B2 | 6/2006 | Stiesdal et al. |
| 7,387,491 B2 | 6/2008 | Saddoughi |
| 7,419,356 B2 | 9/2008 | Stiesdal |
| 7,707,889 B2 | 5/2010 | Maurus et al. |
| 7,748,958 B2 * | 7/2010 | McVeigh et al. .................. 416/1 |

(Continued)

FOREIGN PATENT DOCUMENTS

| WO | 2009/143849 | 12/2009 |
| WO | 2010/133587 | 11/2010 |
| WO | 2010/133591 | 11/2010 |
| WO | 2010/133594 | 11/2010 |

OTHER PUBLICATIONS

Raplh J. Volino; "Separation Control on Low-Pressure Turbine Airfoils Using Synthetic Vortex Generator Jets;" J. Turbomach; Oct. 2003; pp. 765; vol. 125; Issue 4.

(Continued)

*Primary Examiner* — Robert R Raevis
(74) *Attorney, Agent, or Firm* — Feldman Gale, P.A.; Michael C. Cesarano

(57) ABSTRACT

A method of optimizing performance of a wind turbine electric generator (WTG) comprises the steps of measuring the performance of a wind turbine electric generator, defining an area on a blade of the WTG, placing stall flags within said defined area, monitoring the behavior of the stall flags when the WTG is operating, determining a stall line based upon the stall flags during operation, installing vortex generators on the blade adjacent to and upwind of said stall line, monitoring the behavior of said stall flags during operation with vortex generators installed on all blades, and measuring the performance of the WTG to detect improved performance. If there is little or no improvement, repeating the steps on a second WTG using different placement within the defined area for the vortex generators.

11 Claims, 5 Drawing Sheets

(56) References Cited

U.S. PATENT DOCUMENTS

| | | | |
|---|---|---|---|
| 8,092,173 B2* | 1/2012 | Knudsen | 416/1 |
| 2004/0037162 A1 | 2/2004 | Flohr et al. | |
| 2007/0018056 A1 | 1/2007 | Narramore | |
| 2008/0121301 A1 | 5/2008 | Norris | |
| 2008/0175711 A1* | 7/2008 | Godsk et al. | 416/147 |
| 2008/0317600 A1 | 12/2008 | Enevoldsen et al. | |
| 2009/0087314 A1 | 4/2009 | Haag | |
| 2009/0266160 A1 | 10/2009 | Jeffrey et al. | |
| 2010/0143152 A1 | 6/2010 | Subramanian et al. | |
| 2010/0158688 A1 | 6/2010 | Benito et al. | |
| 2010/0278657 A1 | 11/2010 | Kildegaard | |
| 2010/0322766 A1* | 12/2010 | Haans et al. | 416/1 |
| 2011/0008174 A1 | 1/2011 | Ireland | |

OTHER PUBLICATIONS

Clara Marika Velte, et al.; Evaluation of the Performance of Vortex Generators on the DU 91-W2-250 Profile using Stereoscopic PIC; Department of Mechanical Engineering, Technical University of Denmark; 2009; 5 pages.

R.P.J.O.M. Van Rooij; "Determination of the Local Inflow Angle on Rotating Blades;" Section Wind Energy; Delft University of Technology; Jul. 2002; 4 pages.

Scott J. Schreck et al.; "Blade Dynamic Stall Vortex Kinematics for a Horizontal Axis Wind Turbine in Yawed Conditions;" Journal of Solar Energy Engineering; Nov. 2001; pp. 272-281; vol. 123.

G. E. Miller; "Comparative performance tests on the Mod-2, 2.5-mW wind turbine with an without vortex generators;" DASCON Engineering; 1995, Abstract Only.

* cited by examiner

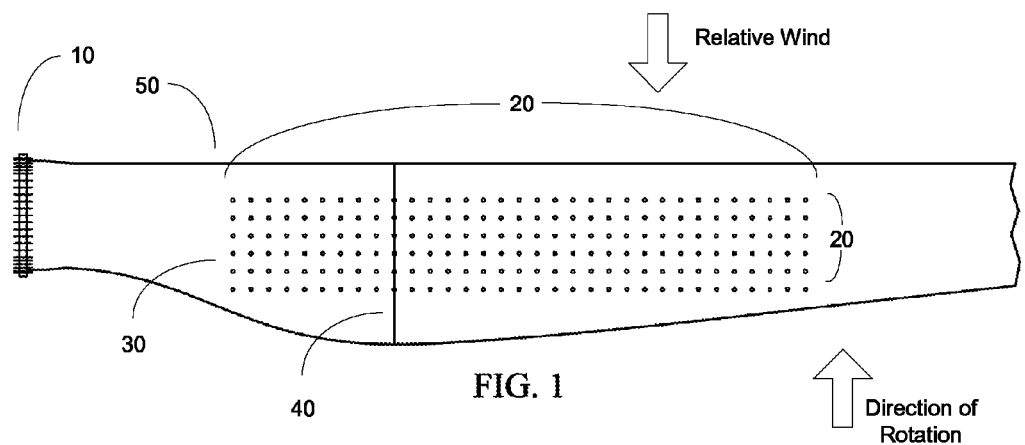
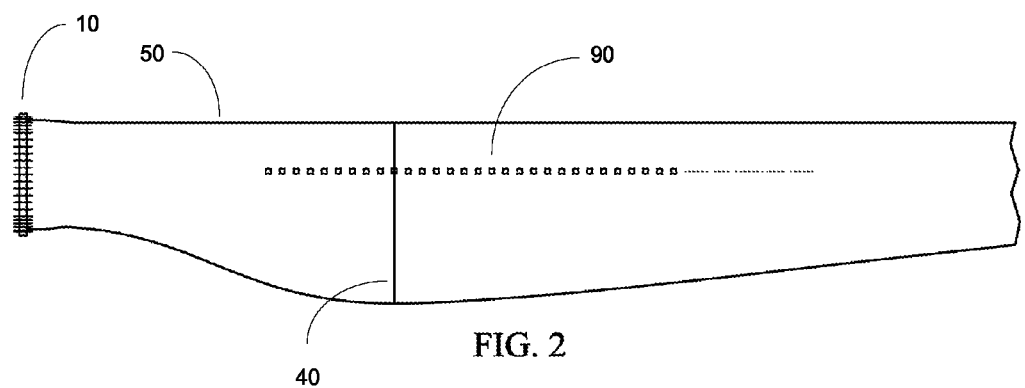

METHOD FOR DETERMINING OPTIMUM VORTEX GENERATOR PLACEMENT FOR MAXIMUM EFFICIENCY ON A RETROFITTED WIND TURBINE GENERATOR OF UNKNOWN AERODYNAMIC DESIGN

CROSS REFERENCE TO RELATED APPLICATIONS

This application claims the benefit of U.S. Provisional Application No. 61/423,921 filed Dec. 16, 2010, the disclosure of which is hereby incorporated herein by reference in its entirety.

BACKGROUND OF THE INVENTION

As renewable energy has become an important economic and environmental imperative, the use of wind turbines to generate electricity on a commercial scale has assumed a role of increasing importance in the national and international arenas. While wind turbines, and the aggregation of wind turbines known as "wind farms," have been in existence for years, current efforts to increase electrical generation capacity using existing equipment is a major focus for development in power systems. Although environmental conditions, such as lack of wind, gusting winds, sand storms, icing conditions, and extreme heat, are factors that cannot be controlled to any significant extent, there are modifications that can be made to existing systems that will improve the overall electricity generation capacity of such systems. Amongst these modifications are active wind flow modification techniques and devices, including the use of wind turbine blade load control technologies such as plasma actuators, and advanced pitch control. These technologies require sophisticated controls and equipment, consume energy, are subject to failure of components, and are more costly than static methods. A simpler and more reliable solution is the retrofitting and use of static devices such as vortex generators and winglets to increase the efficiency of wind turbine blades during normal operation. A properly designed vortex generator system optimizes the design and spacing of the vortex generators to allow a more complete mixing of airflow along currently underutilized blade sections.

Vortex generators ("VGs") have a long history of use, primarily in the aircraft industry. They are employed to increase the efficiency of an airfoil by creating vortices on the low pressure side of an airfoil that will introduce energy into the boundary layer adjacent the surface, thereby moving downstream the point at which the boundary layer will break away from the surface and the airfoil will cease to provide lift, i.e., the point at which stall occurs. For a given set of aerodynamic and environmental conditions, the addition of VGs to an otherwise smooth wing surface can result in a significant increase in the efficiency of the wing.

VGs can also be employed to beneficial effect on wind turbine blades, although the parameters affecting such use must be modified to compensate for differences between airflow over an airplane wing and airflow over a rotating wind turbine blade. Such differences relate primarily to the fact that a wind turbine blade, which rotates about a hub to which the blade root is connected, experiences relatively high wind velocities toward the blade tip and low wind velocities nearer the root, whereas an aircraft wing experiences an essentially constant airspeed along its length. As a result, typical parameters and "rules of thumb" that help to determine the placement and configuration of vortex generators on an airplane wing are not adequate or sufficiently reliable for determining the efficient placement and configuration of vortex generators on a turbine blade. The optimal design and placement of VGs on a turbine blade may vary along the length of the blade, depending upon blade configuration, anticipated wind conditions, and turbine design requirements. In general, the greater the relative wind velocity near the tip of a turbine blade, the less likely it is that that section of the blade will encounter stall conditions. Conversely, analyzing wind conditions closer to the root, the velocity of the relative wind decreases closer to the hub while, simultaneously, structural considerations require a thickening of the blade. The result is that the blade may become an inefficient airfoil near the root, and incipient or actual stall conditions may significantly diminish the efficiency of the inner sections of the blade. When these and other factors are taken into consideration, properly designed and positioned VGs can significantly increase the electrical output of a wind turbine generator for a given ambient wind speed, particularly within a blade section that is near to the blade root.

In order to increase wind turbine efficiency through the use of VGs, ideally, one would like wind turbine blade design information, including the airflow distribution along the blade. Such design details, however, are generally not disclosed by wind turbine blade manufacturers and may not be available upon request. In order to properly simulate the aerodynamic effects of the VGs on a given blade of unknown characteristics, it is first desirable to identify certain blade parameters such as the blade chord length, blade airfoil curvature, and wind flow patterns over the blade surface. In the design and testing of a new blade, much of this information may be obtained, or supplemented, through computer and wind tunnel simulations. Where such simulations are not a practical solution, however, such as where a system is already in existence and is currently operating in the field, a different methodology may be employed.

U.S. Pat. No. 6,065,334 to Corten discloses a method of visualizing fluid flow across a surface that has one or more flap-like members, and a hinge connecting the flap to the surface. The invention is intended to provide a visual indication of the area on an aerodynamic surface at which wind flowing over the surface will separate from the surface under various conditions airflow speed and relative wind angle. This point will provide information about the point at which a stall condition occurs. In Corten, the point of separation is indicated, when the turbine blade is operating, by the flap-like members being caused to rotate on their hinges by a backwards airflow behind the separation point. Where the flap-like members are given a different color on each side, the visual representation of the point of separation will be more easily discerned.

Although Corten's method provides a visual representation showing the point of airflow separation on an aerodynamic surface, the method requires cumbersome preparation and installation of the flap-like members, and provides only visual information showing the point of separation, but does not necessarily indicate where vortex generators should be located for optimum effectiveness. The mere cumbersomeness of Corten's method makes it impractical for use on existing wind turbines having blades whose aerodynamic characteristics are unknown.

A less elaborate but equally effective method of obtaining information regarding a given installed wind turbine unit is to use tell-tales (short pieces of yarn or string attached at one end to the surface of a turbine blade and freely detached at the other end) to indicate the direction of any relative wind.

Tell-tales are old in the art, having been used to indicate airflow separation on aircraft wings for decades.

A significant problem facing the wind power generation industry is that necessary information regarding the aerodynamics of existing installations may be lacking. While it is theoretically possible to run wind tunnel tests and computer simulations to determine the critical aerodynamic characteristics of a given airfoil or blade, the large size and permanent emplacement of existing systems present significant obstacles to the use of wind tunnel testing and computer simulations to design retrofit enhancements for such systems. What is needed is a methodology that is suitable for use on existing, permanent installations, and that provides useful information regarding vortex generator placement whereby the power-generation capacity of such systems may be increased without the need for costly and complex equipment and analyses.

SUMMARY OF THE INVENTION

The number of VG pairs needed to retrofit a typical wind turbine installation is approximately 120 pieces. Because the work needed to apply 40 pieces on each of three blades is considerable, it is desirable to have a low cost, low effort, non-permanent design for testing before permanent VG attachment is made. Once the optimal VG locations are identified through the use of stall flags, a permanent solution may then be employed.

An aspect of the present invention includes optimum placement of VGs on the blade of an installed wind turbine, which can be made by defining the area within which VGs are to be emplaced, and by measuring and comparing the performance of the unit with VGs installed at varying locations within the defined area. This can be done once for similar blades manufactured by a given manufacturer, and can be replicated at various wind farms that are subject to differing wind and other environmental conditions. When an optimum placement has been determined for a blade type situated in a given environment, other blades within the same wind farm, or subject to similar environmental parameters, can be retrofitted without the requirement for extensive empirical testing for each unit.

In this invention, initial estimates may be used to determine a typical boundary layer thickness at the anticipated positions (span-wise and chord-wise) where VGs would be expected to be implemented for large turbine blades of unknown aerodynamic characteristics.

The dimensions of the VGs and the spacing between the VG pairs may be chosen to permit the blades to achieve optimal performance with turbines operating at mid-range power levels at wind speeds of between about 3.5 m/sec and 10 m/sec. In this aspect, optimal performance is deemed to occur when there is proper boundary layer mixing through the vortex generation without inducing significant aerodynamic drag to the blade.

In one embodiment, the shape of a VG is a triangular angled wing whose sharp triangular leading edge extends perpendicularly into the relative wind from the blade surface, and has a local angle of attack of about 18° with respect to the relative wind. The VGs may be fabricated in pairs integrated on a base plate that is suitable for adhesive attachment to existing blades. Each pair of VGs may be symmetrically opposed in order to induce counter-rotating and beneficially interacting vortices. The thickness of the base plate may be kept to a minimum in order to minimize its aerodynamic drag and to allow an acceptable level of flexibility. To enhance the adhesion efficiency of the VGs to the blade surface, slot-like openings are implemented in the base plate.

The VGs may be placed adjacent to and slightly forward of the stall line, as determined through the visual and photographic observation of tell-tales attached at various locations within the defined area of a turbine blade. Once the optimal design and spacing of the VGs has been determined through simulation and testing, a custom template may be created to guide the positioning of the VG pairs on the wind turbine blade. This allows the quick and precise installation of more than one pair of VGs, thereby reducing the time and cost of installation and the likelihood of error. At the same time, a template ensures that the VG pairs are perfectly aligned with each other while maintaining a constant, optimal distance between them.

In accordance with the present invention, optimal VG placement on a blade of undetermined aerodynamic characteristics would occur in a defined area extending from approximately 10 percent to 40 percent of the length of the blade from the blade root, and from about 20 percent to about 70 percent of the maximum chord length from the leading edge. For example, a 37 meter blade used in testing reached optimal efficiency when the VGs were positioned in a straight row 35 percent of the maximum chord length from the leading edge, and extending from 12 percent to 25 percent of the blade length measured along the blade from the root. These parameters may be expected to vary with blades having different aerodynamic characteristics, and the described blade VG placement is but a representative example.

The addition of VGs to a smooth blade induces instabilities to the airflow over the blade by creating counter-rotating vortices which enhance the mixing between the free air flow and the boundary layer (BL). The reenergized boundary layer is thus able to remain attached to the blade surface for a greater length along the chord. In this way the separation is delayed or even eliminated at the inner blade region with positive effects in blade performance. The implementation of VGs naturally also increases the aerodynamic drag of the blade compared to the "clean" blade configuration. However the positive aerodynamic performance achieved with the addition of VGs easily counterbalances the aforementioned drag increase.

When located as determined through the method of this invention, the VGs operate to redirect airflow to re-energize the boundary layer and thereby create additional lift in the midrange of the wind turbine's power curve, thus increasing production of electricity.

BRIEF DESCRIPTION OF THE DRAWINGS

FIG. 1 is a plan view of a turbine blade showing where stall flags may be attached for testing.

FIG. 2 is a plan view of the turbine blade of FIG. 1 showing representative locations for the attachment of vortex generators.

DESCRIPTION OF THE PREFERRED EMBODIMENTS

Figure 3:
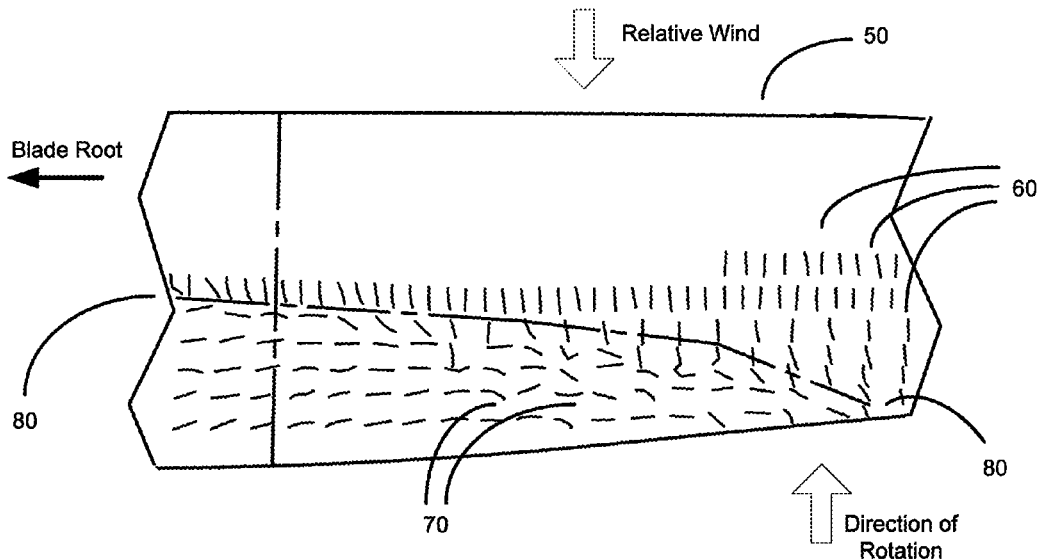
FIG. 3 depicts stall flags on a turbine blade under operating test conditions before the application of vortex generators.

In FIG. 1, a portion of a blade having a representative length of approximately 37 m is viewed from a position directly perpendicular to the direction of blade rotation, which is upward in the diagram. As many of the aerodynamic concepts relating to wind turbine blades were developed through studies of airplane wings, the terms "wing" and "blade" may be used interchangeably herein except as otherwise noted. "Z" numbers indicate distances in mm from the blade root (Z=0) to various points along the span of the blade. The defined area for placement of VGs 20 is between 10% and 40% of the wing (blade) span, measured from the root 10, and from 20% to 70% of the maximum chord 40, measured from the leading edge 50. Stall flag ("telltale") locations 30 are shown within the defined area 20 on the surface through a pattern of dots located between Z=3700 and Z=14,800 along the wingspan, and between 20% and 70% of the maximum chord distance 40 from the leading edge of the blade 50.

The exposed surface and telltale locations 30 are shown on the low pressure side of the blade in FIG. 1. In the illustrated embodiment, the blade has a maximum chord of 3092 (approx. 3.1 m) at a distance of Z=6500 (6.5 m) from the blade root 10. With telltales located as indicated, the blade can be operated and the direction of the telltales noted through visual observation or through photography.

Figure 4:
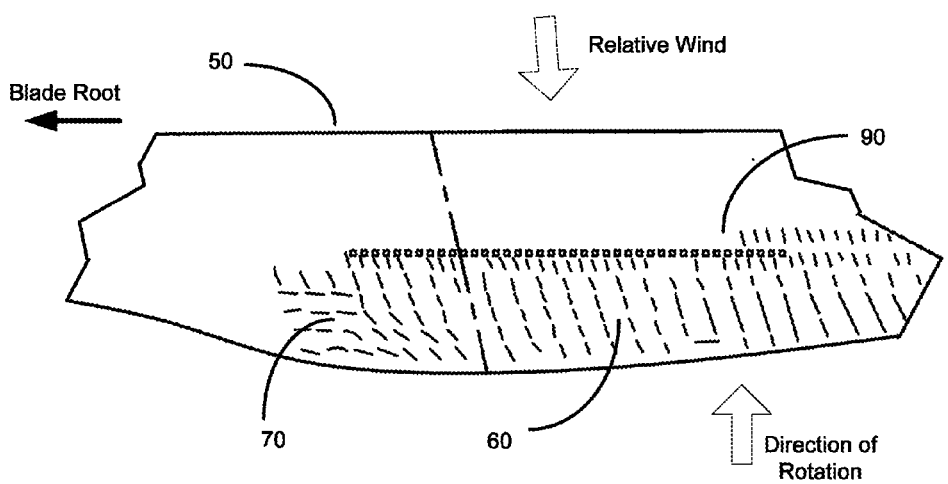
FIG. 4 depicts the stall flags following the installation of vortex generators.

FIG. 2 shows representative locations for vortex generators 90 on the blade shown in FIG. 1. In reaching this configuration, testing as shown in FIGS. 3 and 4 may preferably be done under operating conditions and thereafter, actual emplacement of VGs 90 is made, and the blade tested under field conditions to determine optimal VG placement for maximizing electricity generation at wind velocities most likely to be encountered at the site. Because VGs do not offer significant benefits for the outer two-thirds of the blade, which will always encounter a higher relative wind and be less subject to separation and stall than the inner portions, they are not used in that area. However, inasmuch as a large proportion of the rotational energy of the turbine is developed along the first one-third of the blade from the root, the addition of VGs in that location produces significant gains in the efficiency of the blade, and of the capacity of the wind turbine generator to produce electricity at lower wind speeds.

FIGS. 3 and 4 graphically illustrate how an airflow pattern across a wind turbine blade can be improved using the method of this invention. FIG. 3 depicts a section of a smooth turbine blade on which stall flags have been installed, and which is experiencing near-stall conditions. Stall flags located in an area not experiencing a stall condition are indicated by reference numeral 60, whereas stall flags that are located in a stalled area are indicated by reference numeral 70. In FIG. 3, the maximum chord length 40 is shown as a broken vertical line extending chordwise across the blade. A generally horizontal broken line 80 extends along the span of the blade and represents the location at which the boundary layer air is separating from the blade surface, i.e., the stall line 80. Stall flags 60 extend chordwise across the blade from the leading edge, indicating that the local airflow is perpendicular across the wing, and that the boundary layer has not separated from the surface in that section. Where the boundary layer remains adjacent to the surface, efficient aerodynamic is being achieved. Stall flags 70 extending spanwise along the blade indicate that the boundary layer has separated from the surface, and that the air is flowing spanwise along the blade and is not generating lift. That portion of the blade is in a condition of stall. The stall flags shown in FIG. 3 clearly indicate the areas of boundary layer air separation on the blade, and define the location for placement of the vortex generators as approximately 35% of the maximum chord from the leading edge and extending between 12% to 27% of the distance from the root to the tip. The stall line 80 between chord-wise leaning stall flags 60 and span-wise leaning stall flags 70 indicates the line at which the boundary layer separates from the blade, and provides a reference location for subsequent placement of VGs.

In FIG. 4, VGs 90 have been applied to the blade shown in FIG. 3. With the VG's in place, it can be seen that nearly all the telltales are extended chord-wise, indicating that boundary layer air is maintaining a chord-wise flow across the span of the blade excepting only a very small area near the root. In FIG. 4, the VGs 90 have been placed at a distance of about 35% of the maximum chord distance from the leading edge 50.

Figure 5:
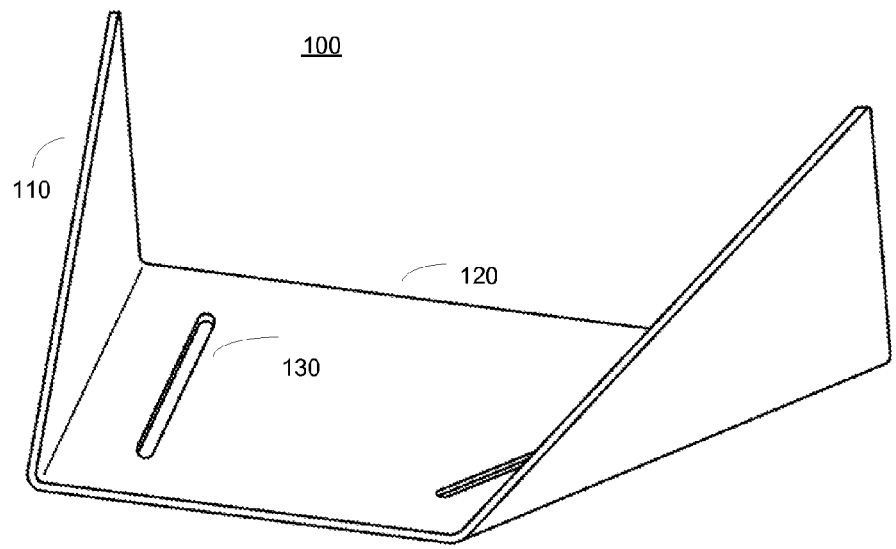
FIG. 5 is a perspective view of a vortex generator made from a stamped metallic or other malleable material that incorporates additional aerodynamic, structural and bonding features.

FIG. 5 depicts an embodiment of a pair of VGs 100. A stainless steel or other malleable plate forms a horizontal base plate 120 that support two upwardly extending, triangular "fins" 110 whose bases are canted toward one another. Slots 130 in the base plate provide improved adhesion to the blade. A benefit of metallic VGs is that they are relatively simple to make as they may be fabricated by stamping and bending the shape from a sheet of malleable material.

Figure 6:
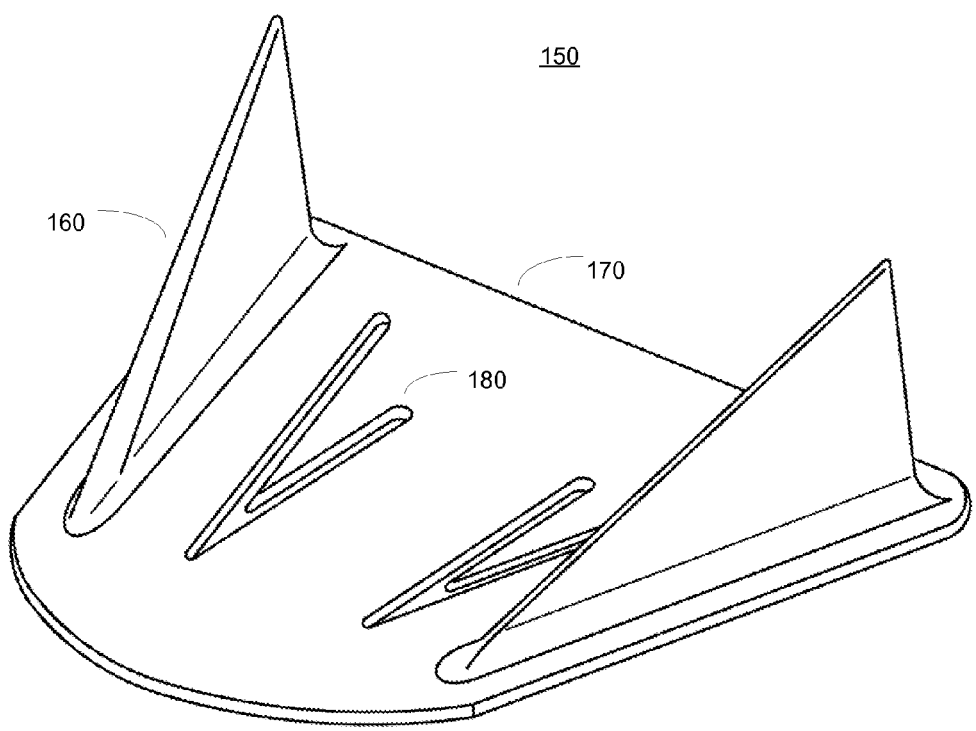
FIG. 6 is a perspective view of a vortex generator made from a molded material that incorporates additional aerodynamic, structural and bonding features.

A preferred embodiment, shown in FIG. 6, depicts a VG pair 150 of a molded plastic design which incorporates aerodynamic, structural and bonding features. The VGs are dual triangular angled wings 160 whose sharp triangular leading edges extend perpendicularly into the relative wind from the blade surface, and which have a local angle of attack of about 18° with respect to the relative wind. When mounted on the low pressure surface of a turbine blade, the fins generate oppositely rotating wind vortexes that extend rearward from the uppermost points of each of the two fins 160. The rotational movement of wind vortices imparts energy to boundary layer air downstream of the VGs, and the energized boundary layer thereafter resists separation from the surface and enhances whatever lift is being provided by the airfoil. In this manner, greater "lift," hence greater turbine torque and production of electricity, can be developed at low-to-moderate wind speeds than turbines having smooth blades. Slots through the base plate enhance adhesion of the VG to the blade surface. The VG pair can be injection molded, silicon molded, or some similar process, any of which will offer advantages in terms of high quantity and low expense of manufacturing VGs. The base plate 170 may be permanently seated against the turbine blade. Slots 180 provide improved adhesion whereby glue or another suitable adhesion product may extend through the base plate or be exposed to ambient air during the curing process.

In testing the process of this invention, a "series design" VG is proposed, as shown in FIG. 6. This design includes all the necessary precise aerodynamic and structural features required for an optimal operation and long lasting adhesion efficiency.

The production of the VG shown in FIG. 6 can be done via injection molding or silicon molding. Silicon molding has the advantage of low cost for mold production although this technique is limited in terms of the maximum number of units that can be produced per mold. The best series production technique is the use of injection molding, which can achieve very large numbers of produced units per mold. The downside of this technique is that the initial cost of the mold is high.

The material selection in case of injection molded VGs is based upon operational and environmental conditions, and the selected material should fulfill the requirements of being resistant to large temperature variations, being UV resistant, being flexible, having good bonding properties, and being resistant to deterioration resulting from humidity. Any suitable material may be used, and it is anticipated that any material meeting these requirements will be satisfactory.

The method of determining the optimum location (spanwise and chordwise) on a wind turbine blade for emplacing VGs first requires that a pattern of stall flags be applied to the low pressure side of the blade, spanwise from about 10% to 40% of the distance from the blade root to the tip, and chordwise from 20% to 70% of the maximum chord from the leading edge. Photographs or other visual observations are then made of the blade with the turbine operating under a windspeed that typically will be 10-12 meters per second (m/s). Although windspeed is given in meters per second, measured relative to the ground, the actual wind across a blade will be variable at different points along the blade, and will be a combination of windspeed plus the rotational velocity of the blade taken at various points along the blade. For each unit upon which stall flag testing is done, stall flag observations, and electricity output measurements should be taken at wind speeds historically the most typical for that site.

Figure 7:
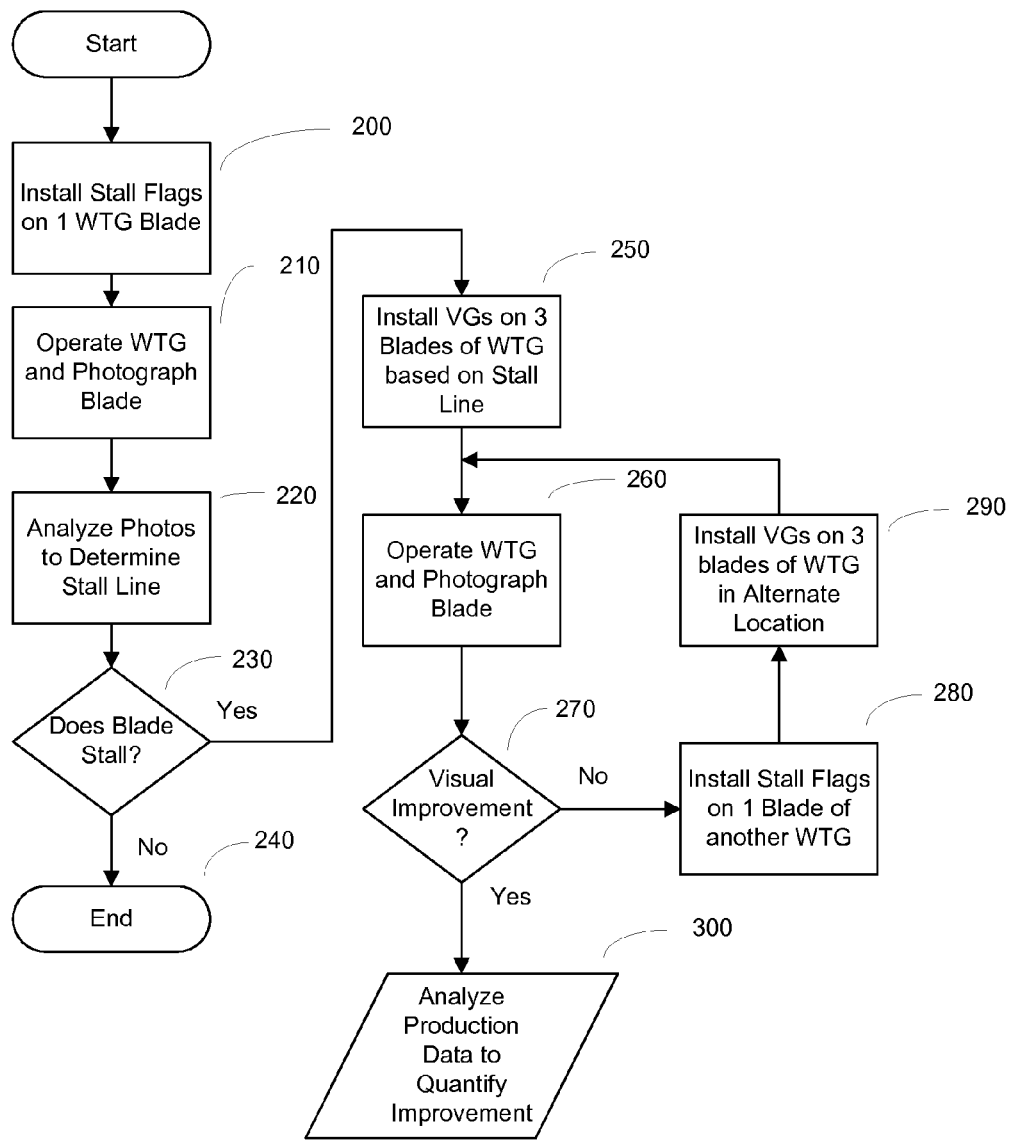
FIG. 7 is a flow chart showing the steps used in an embodiment of the invention.

FIG. 7 is a flowchart showing an embodiment of the steps used in practicing this invention. In this embodiment, a first step is to install stall flags in the defined area 20 of one blade of a wind turbine generator 200. The wind turbine generator is then operated for a sufficient length of time to make observations or take photographs of the blade under typical wind conditions in mid-range power levels at wind speeds of between about 3.5 m/sec and 10 m/sec 210. Visual observations or photographs are then analyzed 220 to determine the location of the stall line on the blade. If the blade encounters stall conditions 230, then its performance may be enhanced by the installation of VGs. On the other hand, if the blade does not show stall conditions during normal operation, then it is already operating efficiently, and VGs would not be expected to improve its performance.

If VGs 90 are to be installed on a wind turbine generator, they will be installed very near to the stall line 80, a short distance prior to the point at which separation occurs 250, and the pattern of stall flags will again be observed 260. If there is visual improvement, based upon the response of the stall flags with the VGs installed, then the degree of improvement may be quantified by analyzing production data 300. Conversely, if visual observation of the blade having stall flags does not indicate an improved airflow pattern 270, then any additional testing on this wind turbine generator may be terminated, and further testing may be carried out using a different wind turbine generator. This is done because VG emplacement is generally permanent, and once a VG has been affixed to a blade, it is not contemplated that it will be removed or relocated.

Testing of a the next wind turbine generator may include attaching stall flags on one blade of the wind turbine generator and observing the airflow pattern to determine the location of the stall line. If the result is similar to the flow pattern for the preceding wind turbine generator, then VGs may preferably be installed on all three blades in an alternate location from that used on the first wind turbine generator. Once again, visual observation of the stall flags may be made, and any visual improvement in the airflow pattern will be analyzed in an attempt to quantify any improved generation capacity. Otherwise, the cycle of stall flag testing, VG installation, and visual observation may be repeated until optimal VG placement has been determined.

Figure 8:
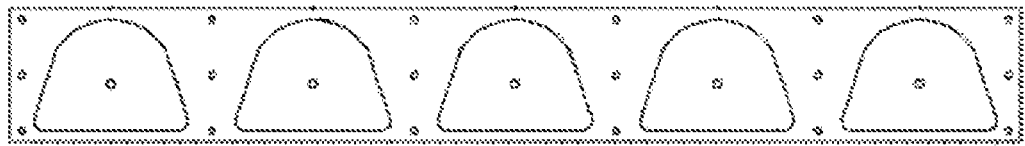
FIG. 8 is a drawing depicting a template suitable for use in positioning VGs for mounting.

FIG. 8 depicts a template suitable for use in placement of VGs on a blade of a wind turbine generator. Once the design parameters of a blade have been determined, the task of retrofit mounting of the VGs on existing blades of the same type is significantly faster and less prone to mistakes if a template such as depicted in FIG. 8 is used.

Using the template of FIG. 8, VGs may be adhesively applied to all three blades in locations based on the stall flag photos. Operational testing with VGs installed may be expected to appear as shown in FIG. 4, with an improvement in airflow characteristics in the previously unproductive section of the blade. If desired, additional testing by way of placing VGs at slightly different locations on other similarly situated wind turbine generators within the general area indicated by stall flag analysis may be done. Measurements of electrical output over typical ranges of wind velocity can be used to determine the optimal VG placement for a turbine subject to historically typical wind conditions. It is estimated that increases in electricity production of 3%-7% in the mid-power band may be achieved, at windspeeds of 3.5 m/s to 10 m/s.

In order to assist with the VG mounting process, the positioning template shown in FIG. 8 may be used. In FIG. 8, the positioning template and the chord-wise and outline marking regions are shown.

In one embodiment of the invention, the positioning process is as follows:

Marking the chord-wise station on the blade with a line.
Positioning the template on the marked line.
Marking the positioning points and optionally the outline of the template cut-out.
Positioning the VG pair on the marked area and aligning it with the positioning points.
Removing the template and positioning the VGs on the previous markings.
Inserting the template over the last VG pair in order to get a position reference and repeat the previous procedure.

The templates are used only as positioning elements and should not be glued onto the blade surface. Since the templates are used only temporarily, their material selection is not crucial. From a cost—benefit point of view the best production method would be laser-cut or water-cut out of a sheet of plastic or metal. Several commercially available adhesives that meet the environmental conditions can be used.

The disclosures of each patent, patent application and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A method of improving the performance of a WTG having blades of unknown aerodynamic configuration comprising the steps of:
 (a) measuring the performance of a WTG;
 (b) affixing a plurality of stall flags upon a blade of said WTG within a defined area extending spanwise along said blade from about 10 percent of said blade span measured from blade root to blade tip to about 40 percent of said blade span, and from about 20 percent of the maximum chord length of said blade from the leading edge of said blade to about 70 percent of the maximum chord length from the leading edge of said blade, each said stall flag comprising a flexible filament having one end attached to said blade and the other end being unattached, whereby the position of said filament indicates a direction of the relative wind at the point of attachment to said blade;

(c) operating said WTG and determining a stall line on said blade by observing wind flow patterns across said blade, whereby said stall flags indicate the direction of the relative wind at each stall flag location, and said stall line exists where adjacent stall flags extend in different directions;

(d) installing vortex generators on said blade within said defined area and adjacent to and upwind of said stall line;

(e) placing vortex generators in identical locations on every other blade of said WTG;

(f) measuring the performance of said WTG to determine the relative increase in performance of said WTG after vortex generators have been installed.

2. The method of improving the performance of a WTG as claimed in claim 1 wherein said WTG performance measurements and said stall flag observations are conducted at the midrange of the WTG's power curve.

3. The method of improving the performance of a WTG as claimed in claim 1 wherein performance measurements and stall flag observations are conducted at ambient wind speeds of between about 3.5 meters/second and about 10 meters/second.

4. The method of improving the performance of a WTG as claimed in claim 1 wherein said step of observing wind flow patterns comprises recording images of said stall flags.

5. The method of improving the performance of a WTG as claimed in claim 1, further comprising the steps of removing said stall flags from said WTG after observing wind flow patterns with vortex generators installed on all blades of said first WTG.

6. The method of improving the performance of a WTG as claimed in claim 1 wherein said vortex generators are installed on said blades using a template.

7. The method of improving the performance of a WTG as claimed in claim 1 wherein said vortex generators are installed such that the each leading edge of each vortex generator has a local angle of attack of about 18° with respect to the relative wind.

8. The method of improving the performance of a WTG as claimed in claim 1 wherein said vortex generators are manufactured using an injection molding process.

9. The method of improving the performance of a WTG as claimed in claim 1 wherein said vortex generators are manufactured from a metallic plate.

10. The method of improving the performance of a WTG as claimed in claim 1 wherein said vortex generators have a base plate having slots therethrough.

11. A method of improving the performance of a WTG having blades of unknown aerodynamic configuration comprising the steps of:

(a) measuring the electric power output of said wind turbine generator in a variety of windspeeds;

(b) constructing a line along the maximum chord of a first blade of said WTG and measuring the length of said line;

(c) constructing a line along the length of said first blade and measuring the length of said line from the root to the tip;

(d) defining an area on said first blade for attachment of a plurality of stall flags, said defined area extending between approximately ten percent (10%) and forty percent (40%) of the line from blade root to blade tip, and between twenty percent (20%) and seventy percent (70%) of the length of said maximum chord line from the leading edge of said blade;

(e) attaching said plurality of stall flags throughout said defined area;

(f) operating said WTG at windspeeds and mid-level power generation typical for said WTG;

(g) monitoring wind flow patterns across said first blade by observing said stall flags during said WTG operation;

(h) determining a stall area based on the wind flow patterns indicated by said plurality of stall flags during monitoring;

(i) providing a plurality of pairs of vortex generators wherein
each pair of said plurality of vortex generators comprises a base and triangular projecting wings, each said triangular projecting wing having a sharp leading edge and forming a local angle of attack with the relative wind of between approximately 16-20 degrees when installed on an operating blade;

(j) attaching said plurality of vortex generators to said first blade in a row near and slightly upwind of said stall area using a template, and repeating said installation on the remaining blades of said WTG in substantially identical locations;

(k) operating said WTG at windspeeds and mid-level power generation typical for said WTG;

(l) monitoring said stall flags during said operation of said WTG;

(m) observing whether said stall flags exhibit that the stall area has been reduced or eliminated;

(n) removing said plurality of stall flags from said first blade;

(o) measuring the electric power output of said wind turbine generator in a variety of windspeeds whereby the increase in performance of said WTG after attachment of said vortex generators may be determined.

* * * * *